Feb. 23, 1926.
H. W. TUTTLE
1,574,137
METHOD OF AND APPARATUS FOR COLLECTING, REFINING, AND UTILIZING BY-PRODUCTS FROM METALS TREATED IN RETORTS
Filed Sept. 5, 1922   2 Sheets-Sheet 1
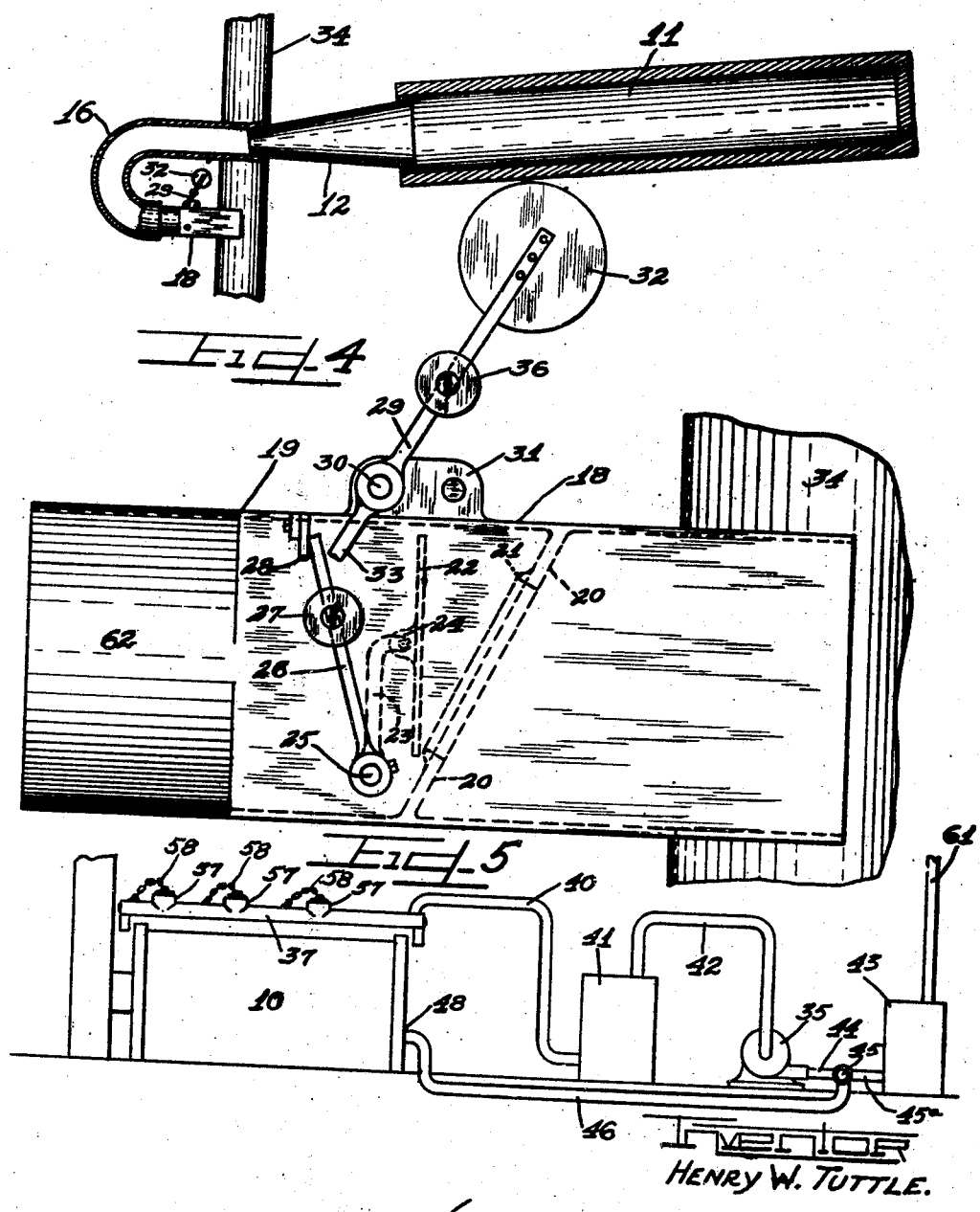
HENRY W. TUTTLE.

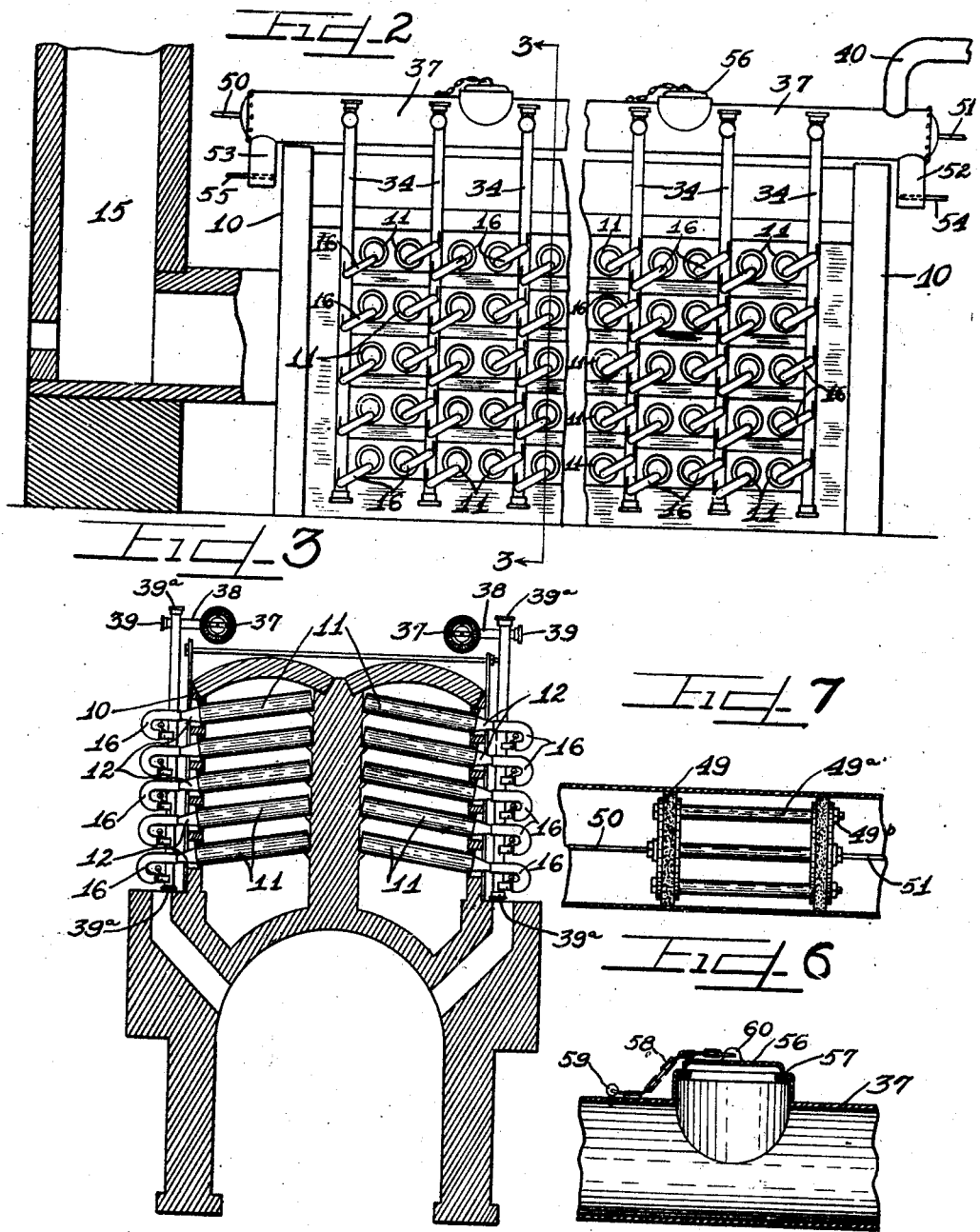

Patented Feb. 23, 1926.

1,574,137

UNITED STATES PATENT OFFICE.

HENRY W. TUTTLE, OF CHICAGO, ILLINOIS.

METHOD OF AND APPARATUS FOR COLLECTING, REFINING, AND UTILIZING BY-PRODUCTS FROM METALS TREATED IN RETORTS.

Application filed September 5, 1922. Serial No. 586,061.

*To all whom it may concern:*

Be it known that I, HENRY W. TUTTLE, a citizen of the United States, residing at Chicago, in the county of Cook and State of Illinois, have invented certain new and useful Improvements in Methods of and Apparatus for Collecting, Refining, and Utilizing By-Products from Metals Treated in Retorts, of which the following is a specification.

My invention relates to retort smelting and refining and is more particularly directed to a method of and apparatus for collecting, refining and utilizing the by-products of the metals which are smelted and refined.

While my invention is applicable to retorts for treating various kinds of metals it will be described and illustrated herein in connection with zinc smelting retorts.

The present method of smelting zinc is to mix zinc ore with proportionate quantities of coal and coke and place the mixture in retorts which are then heated in suitable furnaces. The action which takes place within the retorts produces metallic zinc and large quantities of a very poisonous and inflammable gas, carbon monoxide, which gas escapes from the retorts carrying with it quantities of zinc fumes amounting to from 2 to 4% of the zinc charge resulting in a loss of the zinc as well as of the gas. Due to the fact that there is comparatively little air in the retort the carbon monoxide gas issuing therefrom is nearly pure. I have found the same to be in many instances 90% carbon monoxide. This gas has many times the heating value per cubic foot of similar gases produced in gas producers and is useful for direct application to gas engines and the like.

Another disadvantage of the present practice resides in the fact that the zinc which is discharged from the retorts forms zinc oxide and is scattered about the country surrounding the smelter resulting in damage to the soil and vegetation.

My invention overcomes the objections to the present manner of smelting zinc by collecting the gases and fumes which issue from the retorts and passing the same through a closed system for refinement and commercial utilization. The gases treated by my invention may be separated from the solids by precipitation and if desired may be scrubbed and then utilized as fuel for gas engines, or may be directed into boiler furnaces for combustion purposes. I have found this fuel readily adaptable for combustion in zinc furnaces. The solids which are precipitated from the gases and fumes are collected in any desired manner and applied to useful purposes.

An object of my invention is to collect and utilize the gases and fumes issuing from retorts for reclaiming the by-products therein.

Another object of the invention is to utilize the gases issuing from retorts as fuel for heating the retorts.

A further object of the invention is to collect and refine the gases from the retorts for use in gas engines or the like.

A still further object of the invention is to collect the solids such as blue powder resulting from condensation of zinc fumes issuing from retorts.

A yet further object of the invention is to prevent the formation of zinc oxide in zinc treatment and the settling of the same over the surrounding territory to the injury of the vegetation and soil.

A still further object of the invention is to improve retort smelters generally.

Another and further object of the invention is to provide means for collecting and utilizing the gases and fumes evolved from retorts and providing automatic means for indicating the collapse or butchering of the retorts thus admitting air into the retorts.

The above and other objects will be apparent from the following description and drawings and will be particularly pointed out in the appended claims.

In the drawings,

Fig. 1 is a longitudinal vertical section through a retort with a part of my improved structure connected therewith.

Fig. 2 is a side elevation partially in section of a furnace containing a plurality of retorts showing a part of my improved structure applied to the same.

Fig. 3 is a vertical section taken on line 3—3 of Fig. 2.

Fig. 4 is an enlarged elevational view of a valve chamber showing details of construction in dotted and in full lines.

Fig. 5 is a diagrammatic representation of a furnace, a dust collector and scrubber and connections between the various units for carrying out my invention.

Fig. 6 is a partial sectional view of a header showing a safety valve therein and Fig. 7 is a sectional view showing a brush which may be utilized for removing the accumulation of solid matter deposited in the pipe system of the invention.

10 indicates a smelting furnace of the usual character having a plurality of retorts 11 placed therein as shown in the drawings. Retorts, as may be understood, are placed in the furnace with the open ends lower than the closed ends, which lower ends are covered with condensers 12, which are preferably conical in elevation. At the ends of the condensers 12, I apply couplers 16 which in the drawings are shown as U-shaped, and which, if desirable, may be made of flexible material for ease of application and adjustment as conditions may require. One end of a coupler 16 communicates with the outer end of a condenser 12, while the other end of the coupler is in communication with a valve chamber 18, the valve chamber in turn communicating with a vertical pipe 34, which I term a vertical header. By referring to Fig. 2 it will be observed that a single furnace is supplied with a plurality of the vertical headers 34 and that all of the retorts in the furnace are joined by means of the couplers 16 and the valve chambers 18 to these headers in such manner that any fumes or gases escaping from the retorts will be directed into the headers 34. Along the top of the furnace I provide horizontal headers 37 suitably supported by the furnace structure. The vertical headers 34 are joined to the horizontal headers 37 by means of suitable connections 38 which are provided with clean-out doors 39 at their outer ends. The passage of gases and fumes through the horizontal headers as shown in Figs. 2 and 5 is away from the stack 15. Pipe 40 leads from the headers 37 to a dust collector 41 which is suitably arranged with respect to the furnace 10. As a means for moving the gases and fumes through the headers and into the dust collector 41, I provide a suction fan 35 which may be suitably operated as desired, and which fan is connected by pipe 42 to the dust collector. A pipe 44 leads from the fan 35 to a three-way or by-pass valve 45. One branch 45$^a$ leads to a scrubber 43 while another branch 46 leads to the furnace 10 and enters the same at 48. It will be observed that disposal of the gases from the fan 35 may be made at will and directed either back to the furnace 10 for use as fuel in heating the retorts 11 or may be directed through the scrubber 43 and by means of outlet 61 lead to a gas engine or caused to perform other useful work.

Experience has shown that in the use of retorts the walls of these collapse or butcher from time to time thus admitting air thereinto. The present means of ascertaining such event is by the furnace attendant watching the flames which are now permitted to burn in the open air at the ends of the condensers. In my system, which is a closed system, I provide automatic means for indicating collapsing or butchering of the retorts and which means may be effective to indicate variations in the flow of the gases through the pipe systems, which may be caused otherwise. In the valve chambers 18, which in the present instance, I prefer to make rectangular for a portion of their length and circular as at 62 in Fig. 4 for interfitting with the connector 16, about the inner walls of the rectangular portion of the chamber I provide a valve seat by means of the flange 20 which is indicated in dotted lines in Fig. 4 as being inclinded in position with respect to the length of the chamber. The seat itself is indicated at 21. For closing the valve opening I provide a disc valve 22 which is hinged at 24 to an arm 23, the latter being secured to a transversely extended shaft 25 which is suitably supported in the side walls of the chamber. Outwardly of one of the walls of the chamber an arm 26 is fastened to the shaft 25 and arranged in angular relation with respect to the valve supporting arm 23 so as to maintain the valve in open position when the arm 26 rests against a stop 28 suitably secured to the outside of the valve chamber 18. A weight 27 is slidably mounted on the arm 26 for the purpose of governing the actuation of the valve 22. In Fig. 4 the valve 22 is shown in dotted lines in open position and with the corresponding position of the arm 26 resting against the stop 28. A block 31 is secured to the top of the chamber 18 in any suitable manner and has an arm 29 pivoted to it at 30 and arranged to move in a vertical plane. A target or signal 32 is affixed to the outer end of the arm, while the lower end of the arm 30 projects beyond pivot 30 and into the path of movement of the arm 26 which is actuated by the movement of the valve 22. A weight 36 is slidably mounted on the arm 29 for purposes well understood. The parts are so arranged that the gas and fumes travel from left to right as viewed in Figs. 1 and 4. By reason of the use of the suction fan 35 a suction is established throughout the pipe system and continues as long as the system is complete. If, for instance, any retort should collapse or butcher the gases and air present in the furnace would immediately be drawn through such butchered retort and through the valve chamber 18 associated therewith. By reason of the balancing of the valve 22 by means of the weighted arm 26 the movement or current of the added volume of gases and air would immediately cause the valve 22 to close against its seat 21, thereupon shutting off further gas travel through that particular retort and its associated parts thus preventing the formation of an explosive mixture and indicating the defective retort. As the valve 22 is closed as above described, the arm 26 will fall against the lower end 33 of the arm 29 moving the arm with its target 32 into abnormal position whereupon the furnace attendant may know that something is wrong with the system associated with the particular valve chamber having its signal in abnormal position.

In carrying out my invention I proceed as follows:

The connectors 16 are removed from the condensers 12 which in turn are removed from the retorts 11 so as to permit charging of the retorts with the usual mixture of zinc ore, coke and coal. The condensers are then applied to the open ends of the retorts and secured in position and the connectors 16 are then joined to the condensers. As the gases and fumes are evolved in the retorts 11 these are led through the condensers 12, connectors 16, chambers 18, vertical headers 34 into the horizontal headers 37. In the passage of the fumes and gases from the condenser some of the solids are deposited on the sides of the various members of the pipe system which continues throughout the length of the pipe system. The gases and what fumes remain are then led into the gas or dust filter or collector 41 where all of the solid matter is removed. The gases are then withdrawn from the collector and returned to the retort furnace for use as fuel or delivered to gas engines or other means for commercial utilization. At intervals the solid matter deposited on the sides of the pipe system may be removed by suitable tools. I have shown in Fig. 7 of the drawings a brush which may be employed for removing the accumulation from the headers. The brush consists of two circular brush members 49 which are maintained in spaced relation by spacers 49ᵃ suitably secured by means of nuts 49ᵇ. The brush may be moved back and forth by ropes or cables 50 and 51 suitably secured thereto, which may be actuated from either end of the headers.

The process of my invention involves the recovery of by-products from gases and fumes evolved in retorts and consists in moving these gases and fumes through a closed pipe system whereby the solids will be deposited and the gases withdrawn entirely free of the solid matter, thereby conserving all of the gases and solid matter and preventing the formation of zinc oxide, by the burning of the gases and fumes at the open ends of the retorts or their condensers which has heretofore resulted in the formation of and scattering of zinc oxide with the attendant injury and waste as described.

While I have described more or less precisely the details of my invention I do not wish to be understood as limiting myself thereto as I contemplate changes in form and the proportion of parts and the substitution of equivalents as circumstances may suggest or render expedient without departing from the spirit and scope of my invention.

I claim:

1. The process of recovering by-products from retort gases and fumes which consists in collecting and directing the gases and fumes from the retorts through a gas filter and passageway closed to the admission of air, depositing the precipitated solid content from the gases and fumes in said filter and withdrawing the gases from the filter and passageway without oxidizing the gases and fumes by mixing with air.

2. The process of recovering by-products from zinc gases and fumes coming from retorts which consists in collecting and directing the gases and fumes from the retort through a gas filter and passageway closed to the admission of air, precipitating the solid content of said gases and fumes in said filter and on the walls of the passageway, and subsequently withdrawing the remaining gases from the filter and passageway without oxidizing the gases and fumes by mixing with air.

3. The process of recovering by-products from zinc treated in retorts which consists in collecting the by-products in their original state as they issue in gaseous form from the retort, conveying and refining the same in an imperforate pipe system without mixing the same with air, thereby salvaging the by-products in their unoxidized state.

4. An apparatus for recovering zinc and by-products in the treatment of zinc ore including a plurality of retorts connected to a common elongated imperforate pipe system by a plurality of detachable flexible imperforate pipes, a dust collector interposed in the imperforate pipe system, means for positively moving the gases through the system without the admission of air into the moving gas passing through the imperforate pipe system, means for withdrawing precipitated solids from the pipe system, and means for withdrawing the unprecipitated gases from the system.

5. An apparatus for recovering by-products from zinc bearing ores treated in retorts including a plurality of retorts each provided with a condenser, flexible detachable connectors leading from each of the condensers to a common header, the said connectors and header providing an imperforate pipe system, and means interposed in the pipe system for removing precipitated solids from the gases passing therethrough.

6. An apparatus for recovering by-products from zinc bearing ores treated in retorts, including in combination a plurality of retorts each provided with its individual condenser, a header and a plurality of vertical pipes connected therewith, flexible detachable connectors leading from each of said condensers to the said vertical pipes, said retorts, condensers, flexible connectors, vertical pipes and said header forming an imperforate conduit system whereby to exclude air from the gases generated in the retorts and preventing oxidation of said gases, and an imperforate pipe system connected with the header, the last said pipe system being provided with means for withdrawing and filtering unprecipitated gases from the header.

7. A device for collecting and conveying the fumes created in a metal treating retort including in combination a pipe system terminating in a dust collector, connections between the retort and the pipe system for directing all of the evolved gases thereto, and means in said connections operable by the flow of gases therethrough for indicating collapse of the retort.

8. In combination with a retort smelting furnace including a furnace structure, a plurality of retorts therein, detachable condensers at the ends of said retorts, a plurality of vertically disposed pipes arranged at intervals along said furnace, a plurality of horizontally disposed headers over said furnace, connections between said pipes and said headers, and flexible detachable connections between the retort condensers and said vertical pipes whereby all the fumes from said retorts may be diverted into said headers, and means communicating with said headers for removing the solids precipitated from the fumes passing therethrough.

9. A retort smelting furnace including a furnace structure, a plurality of retorts therein, condensers at the ends of said retorts, a plurality of vertically disposed pipes arranged at intervals along said furnace, a plurality of horizontally disposed headers over said furnace, connections between said pipes and said headers, and connections between the retort condensers and said vertical pipes whereby all the fumes from said retorts may be delivered into said headers, and means communicating with said headers for removing the solids from the fumes passing therethrough, and means in said latter connections for indicating irregularity of flow through the same.

10. An apparatus for recovering the by-products from the gases and fumes evolved in retorts including in combination condensers associated with the retorts, a closed pipe system including headers and multiple pipes communicating with the headers, flexible detachable connections between said condensers and said pipes for directing the gases and fumes from the retorts into said pipe system, and means for moving said gases and fumes through said system for depositing the solids therein.

11. An apparatus for recovering the by-products from the gases and fumes evolved in retorts including in combination condensers associated with the retorts, a closed pipe system including headers and multiple pipes communicating with the headers, flexible detachable connections between said condensers and said pipes for directing the gases and fumes from the retorts into said pipe system, and means for moving said gases and fumes through said system for depositing the solids therein.

12. In combination with retort smelting furnace including a furnace structure, a plurality of retorts therein, and condensers at the ends of said retorts, a plurality of pipes, flexible detachable connections between said condensers and said pipes, a header, connections for venting said pipes into said header, and means for withdrawing gaseous materials from said retorts through said condensers and said pipes into said header.

13. A retort smelting furnace including a furnace structure, a plurality of retorts therein, condensers at the ends of said retorts, a plurality of pipes, a plurality of headers, connections between said retorts, condensers and said pipes whereby all the fumes from said retorts will be delivered into said pipes and thence into said headers, means communicating with said headers for insuring movement of the fumes from said retorts into said pipes and thence into said headers, means communicating with said headers for removing the solids from the fumes passing therethrough, and means for indicating irregularity of flow through said retorts, condensers and pipes connecting therewith.

14. In an apparatus for smelting metals, detachably connected means for connecting retorts in multiple to a common header, a suction fan for causing the movement of fumes from the retort through the header, and means connected with said header for collecting and separating the solid and gaseous materials from the retorts.

15. An attachment for a zinc smelting furnace provided with a plurality of retorts and individual condensers attached to said retorts, comprising a filter provided with filtering media for recovering solid material precipitated from the fumes evolved in the zinc smelting retorts, flexible detachable connections leading from said retort condensers to an imperforate pipe system connected with said filter, and means for moving the gases generated in the retorts through said pipe system and said filter.

In testimony whereof I have signed my name to this specification this 29th day of August A. D. 1922.

HENRY W. TUTTLE.